(12) United States Patent
Shurbanov et al.

(10) Patent No.: US 7,369,512 B1
(45) Date of Patent: May 6, 2008

(54) SYSTEMS AND METHODS FOR EFFICIENT PACKET DISTRIBUTION IN AN AD HOC NETWORK

(75) Inventors: Vladimir Alexandrov Shurbanov, Malden, MA (US); Jason Keith Redi, Belmont, MA (US)

(73) Assignee: BBN Technologies Corp., Cambridge, MA (US)

( * ) Notice: Subject to any disclaimer, the term of this patent is extended or adjusted under 35 U.S.C. 154(b) by 824 days.

(21) Appl. No.: 10/702,308

(22) Filed: Nov. 6, 2003

(51) Int. Cl.
*H04L 12/28* (2006.01)

(52) U.S. Cl. .................................. 370/254; 370/392

(58) Field of Classification Search ................ 370/229, 370/254–256, 389, 390, 392, 400, 401
See application file for complete search history.

(56) References Cited

U.S. PATENT DOCUMENTS

| | | | |
|---|---|---|---|
| 5,175,843 A | 12/1992 | Casavant et al. | |
| 5,541,912 A | 7/1996 | Choudhury et al. | |
| 5,649,119 A | 7/1997 | Kondoh et al. | |
| 5,764,895 A | 6/1998 | Chung | |
| 5,884,040 A | 3/1999 | Chung | |
| 5,959,989 A * | 9/1999 | Gleeson et al. | 370/390 |
| 5,960,047 A | 9/1999 | Proctor, Jr. et al. | |
| 5,974,327 A | 10/1999 | Agrawal et al. | |
| 6,000,011 A | 12/1999 | Freerksen et al. | |
| 6,032,190 A | 2/2000 | Bremer et al. | |
| 6,067,301 A | 5/2000 | Aatresh | |
| 6,094,435 A | 7/2000 | Hoffman et al. | |
| 6,216,167 B1 | 4/2001 | Momirov | |
| 6,262,976 B1 | 7/2001 | McNamara | |
| 6,272,567 B1 | 8/2001 | Pal et al. | |
| 6,362,821 B1 | 3/2002 | Gibson et al. | |
| 6,473,434 B1 | 10/2002 | Araya et al. | |
| 6,628,929 B1 * | 9/2003 | Nomura | 455/126 |
| 6,683,885 B1 | 1/2004 | Sugai et al. | |
| 6,687,781 B2 | 2/2004 | Wynne et al. | |
| 6,721,273 B1 | 4/2004 | Lyon | |
| 6,769,043 B1 | 7/2004 | Fedorkow et al. | |
| 6,804,236 B1 * | 10/2004 | Mahajan et al. | 370/390 |
| 6,807,172 B1 * | 10/2004 | Levenson et al. | 370/389 |
| 6,977,895 B1 | 12/2005 | Shi et al. | |
| 6,980,515 B1 | 12/2005 | Schunk et al. | |

(Continued)

OTHER PUBLICATIONS

P. Jacquet et al.; Optimized Link State Routing Protocol for Ad Hoc Networks; Proc. IEEE INMIC; Pakistan; 2001; pp. 1-7.

(Continued)

*Primary Examiner*—Wing Chan
*Assistant Examiner*—Hong Sol Cho
(74) *Attorney, Agent, or Firm*—Ropes & Gray LLP

(57) ABSTRACT

A system provides packet flooding in a network (200) that includes multiple nodes (210). The system may receive a flood packet, select one or more of the nodes (210) as a like number of one or more relays (210), and attach a header to the flood packet. The header may instruct the one or more relays (210) to which of the nodes (210) to send the flood packet. The system may send the flood packet with the attached header to the one or more relays (210). The one or more relays (210) may retransmit the packet such that each of the nodes (210) in the network (200) receives a single copy of the flood packet.

19 Claims, 16 Drawing Sheets

U.S. PATENT DOCUMENTS

| | | | |
|---|---|---|---|
| 7,046,628 B2 | 5/2006 | Luhmann et al. | |
| 7,106,703 B1* | 9/2006 | Belcea | 370/310 |
| 7,266,386 B2* | 9/2007 | Kim et al. | 455/522 |
| 2002/0186694 A1* | 12/2002 | Mahajan et al. | 370/390 |
| 2003/0016624 A1* | 1/2003 | Bare | 370/217 |
| 2003/0124976 A1* | 7/2003 | Tamaki et al. | 455/15 |
| 2003/0174719 A1* | 9/2003 | Sampath et al. | 370/402 |
| 2004/0202164 A1 | 10/2004 | Hooper et al. | |
| 2005/0050221 A1 | 3/2005 | Tasman et al. | |

OTHER PUBLICATIONS

U.S. Appl. No. 10/694,968, unpublished, Elliott, Brig Barnum.

Office Action dated Oct. 11, 2005, Serial No. 10/649,030.

Office Action dated Oct. 10, 2006, Serial No. 10/649,030.

Office Action dated May 17, 2007, Serial No. 10/649,030.

CMSC 451, Dave Mount. CMSC 451: Lecture 11. "Articulation Points and Biconnected Components," Tuesday, Oct. 6, 1998. www.cs.umd.edu/~samir/451/bc.ps. pp. 1-5.

Garg, et al, "Improved Approximation Algorithms for Biconnected Subgraphs via Better Lower Bounding Techniques," Department of Computer Science and Engineering, Indian Institute of Technology, New Delhi, pp. 103-111 (1993).

Hsu, et al., "Simpler and Faster Biconnectivity Augmentation," Journal of Algorithms, 45:55-71 (2002).

Jennings, et al., "Topology Control for Efficient Information Dissemination in Ad-hoc Networks," Jet Propulsion Laboratory, pp. 1-7.(2002).

Khuller, et al., "Biconnectivity Approximations and Graph Carvings," Journal of the ACM, 41(2):214-235 (1994).

Li, et al., "Sending Messages to Mobile Users in Disconnected Ad-Hoc Wireless Networks," MOBICOM (2000).

Liao, et al., "GRID: A Fully Location-Aware Routing Protocol for Mobile Ad Hoc Networks," Telecommunications Systems, 18(1):37-60 (2001).

Lin, et al., "Adaptive Clusterin for Mobile Wireless Networks," IEEE Journal on Selected Areas In communications, 15(7):1-21 (1997).

McAuley, et al., "Self-Configuring Networks," MOBICOM pp. 315-319 (2000).

* cited by examiner

FLOOD

MPR

UNICAST

BROADCAST

SYSTEMS AND METHODS FOR EFFICIENT PACKET DISTRIBUTION IN AN AD HOC NETWORK

GOVERNMENT CONTRACT

The U.S. Government may have a paid-up license in this invention and the right in limited circumstances to require the patent owner to license others on reasonable terms as provided for by the terms of Contract No. DAAD19-01-2-0011 awarded by the United States Army.

BACKGROUND OF THE INVENTION

1. Field of the Invention

The present invention relates generally to network communication and, more particularly, to systems and methods for efficiently flooding data in a network.

2. Description of Related Art

Communications in the future will increasingly rely on networked data acquisition and communication. In addition to requirements for versatility and survivability, mobile communication devices will need to be lightweight, inexpensive, and easy to maintain. A major obstacle in meeting these requirements is the devices' power sources. Because revolutionary improvements in battery technology are not expected in the near future, energy-efficient operation becomes paramount. This becomes increasingly important for unattended systems, such as sensors and robots, that must remain operational without recharging for prolonged time periods.

Many routing protocols have been designed to minimize the energy consumed for multi-hop packet delivery. Most of these protocols, however, do not adequately address the mechanisms for dissemination or discovery of network state information, often relying on flooding to perform these tasks. Its simplicity and effectiveness make flooding an attractive solution. These advantages, however, come at the price of frequently redundant transmissions, particularly in dynamic environments, such as a military battlefield. This redundancy adversely affects both the energy efficiency and the scalability of mobile networks.

In the simplest form of flooding, a node receiving a flood packet retransmits it to all of its neighbors. The neighbors, in turn, retransmit the flood packet to all of their neighbors and so on until all network members receive a copy of the original packet. The inefficiency of this approach is depicted in FIG. 1. FIG. 1 is a graph that illustrates the relationship between the longest network path (network diameter), the probability of two nodes having a common neighbor (a factor correlated to the network connectivity), and the number of duplicate transmissions for a flood packet. Clearly, large, well-connected networks can be easily crippled by the amount of redundant traffic generated by such a simplistic dissemination method.

Most applications that rely on flooding incorporate some type of mechanism designed to constrain the traffic explosion caused by uncontrolled flooding. Such mechanisms include: (1) generation control that involves restricting the nodes that are authorized to generate flood packets (e.g., clustering or hierarchical network organization, etc.) and/or censoring the generated flood information to filter out the redundant portion (e.g., STAR routing); (2) batching that involves nodes storing received flood packets, batching them into a single packet, and transmitting such packets at regular intervals, rather than immediately after reception of the original packet; and (3) propagation control that involves restricting the circulation of flood packets by including sequence tags/time stamps, based on which duplicate packets are detected and eliminated, and time-to-live counters that limit the area of flood packet distribution (e.g., Hazy-Sighted Link State and Fish-Eye State Routing).

The main shortfall of these approaches is that they aim to reduce the traffic load caused by flooding without adequately addressing the propensity for redundant transmissions that is inherent in the uninformed retransmission of messages performed by flooding. Duplicate transmissions can be easily avoided if the connections between nodes are known. Moreover, that knowledge is often readily available, since the data that is typically flooded is, in fact, the link information needed to optimize the flooding process.

An existing method that directly addresses transmission duplication is offered by Multi-Point Relaying (MPR), as part of the Optimized Link-State Routing Protocol. In MPR, flood packets are retransmitted only by nodes that are designated as relays. The relays are selected so as to minimize the overlap between the sets of nodes that each relay covers, thus, minimizing the duplicate transmissions received by these nodes. The ideal solution to this minimization problem is given by a connected dominating set of the network graph (i.e., a connected subset of a set of nodes of a network whereby all nodes in the network are either within the dominating set or a neighbor of a node in the dominating set). Identifying this set, however, requires global knowledge of the network and is computationally an NP-complete problem. An NP-complete problem is a class of problems where there are no efficient known ways to calculate an optimal solution. For these classes of problems, if one is interested in the optimal solution, often the only way is to do an exhaustive search through all possible solutions (which, of course, does not scale well with the problem size).

To circumvent these feasibility barriers, MPR operates only with the network state of the flood source's 2-hop neighborhood and employs a heuristic algorithm based on a greedy strategy of preferentially selecting the most connected 1-hop neighbors as relays. This strategy is based on the assumption that flood packets are transmitted: (1) via omni-directional broadcast and (2) at a single power level. This makes it incompatible with unicast transmissions and directional-antenna transmissions and unable to effectively exploit the energy-conserving potential of variable-power transmission.

As a result, there exists a need for energy-efficient flooding techniques.

SUMMARY OF THE INVENTION

Systems and methods consistent with the principles of the invention provide energy-efficient flooding techniques to optimize the packet distribution process.

In one aspect consistent with the principles of the invention, a method for packet flooding in a network that includes multiple nodes is provided. The method may include generating a flood packet, selecting one or more of the nodes as a like number of one or more relays, and attaching a header to the flood packet. The header may instruct the one or more relays to which of the nodes to send the flood packet. The method may also include sending the flood packet with the attached header to the one or more relays.

In another aspect, a system for flooding packets in a network that includes multiple nodes is provided. The system may include means for receiving a flood packet, means for identifying one or more of the nodes as a like number of one or more relays, and means for sending the flood packet to the one or more relays. The system may also include means for retransmitting the flood packets from the one or more relays such that each of the nodes in the network receives one copy of the flood packet.

In yet another aspect, a method for flooding packets in a network that includes multiple nodes is provided. The method may include receiving a flood packet at a first one of the nodes and determining whether the flood packet includes an attached header, where the header identifies one or more second nodes to which the first node is to transmit the flood packet. The method may also include extracting the header when the flood packet includes the header and retransmitting the flood packet to the one or more second nodes based at least in part on the extracted header.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention provide energy-efficient flooding techniques to improve the efficiency of the packet distribution process, thereby prolonging the battery life of wireless network devices. In addition, these systems and methods may improve scalability and spatial reuse, resulting in increased network throughput.

Exemplary Network

Figure 1:
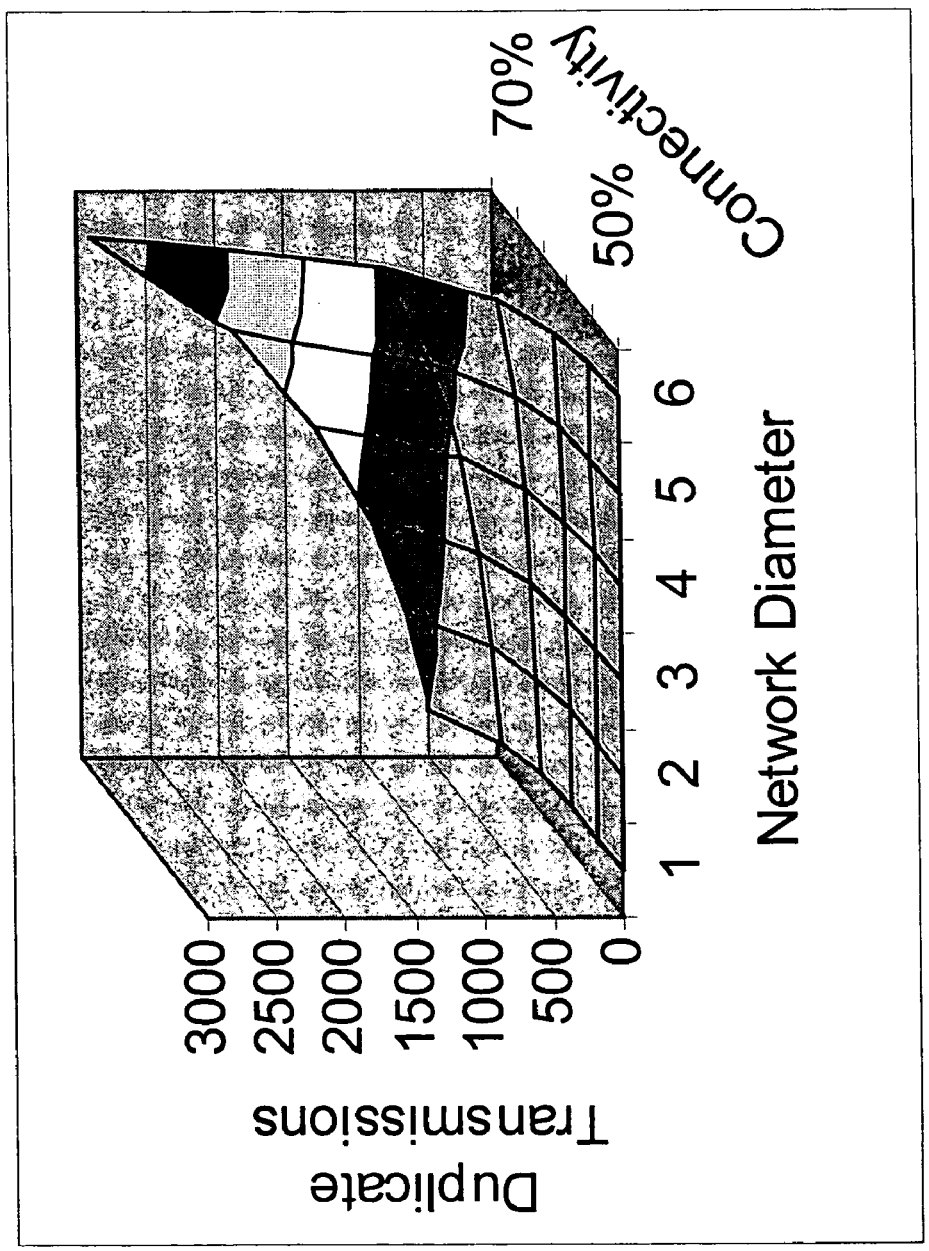
FIG. 1 is a graph that illustrates the relationship between the longest network path, the probability of two nodes having a common neighbor, and the number of duplicate transmissions for a flood packet.
Figure 2:
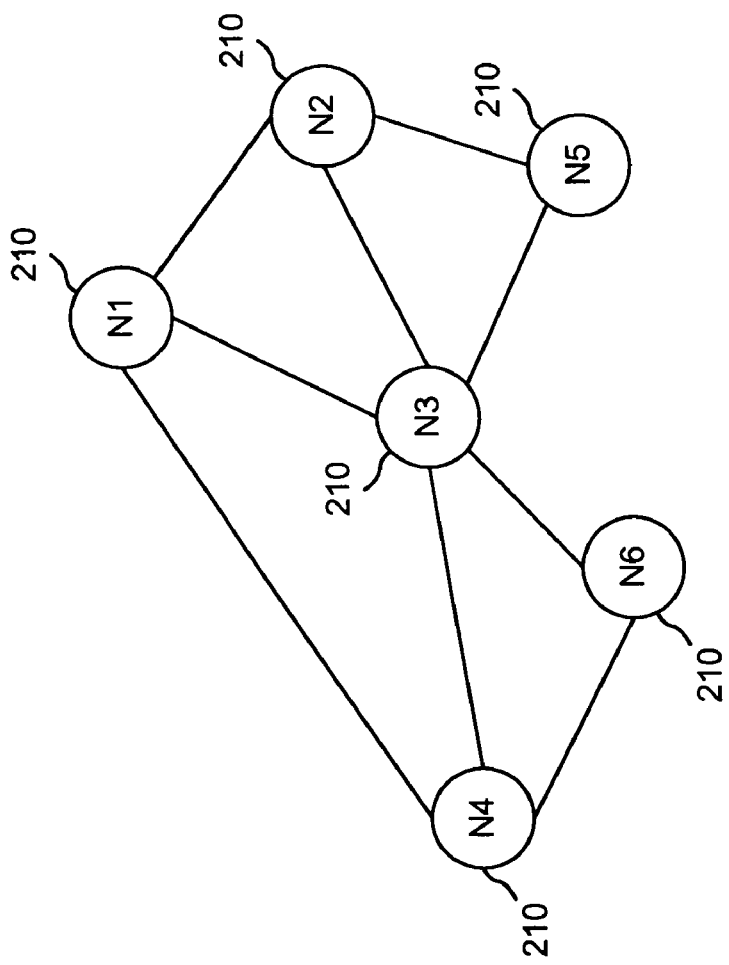
FIG. 2 is a block diagram of an exemplary network in which systems and methods consistent with the principles of the invention may be implemented.

FIG. 2 is a diagram of an exemplary network 200 in which systems and methods consistent with the principles of the invention may be implemented. Network 200 may include multiple interconnected nodes 210 N1-N6. While six nodes 210 are illustrated in FIG. 2, a typical network 200 may include more or fewer nodes 210. Nodes 210 may communicate with each other via wireless connections to form a wireless ad hoc network.

Nodes 210 may maintain knowledge about the rest of network 200. For example, each node 210 may periodically transmit a link state update (LSU) that includes its location information (e.g., global positioning system (GPS) coordinates or relative location information) to the rest of network 200. Nodes 210 may use one or more flooding techniques consistent with the principles of the invention to transmit the LSUs, or other information that may be beneficial to other nodes 210 in network 200.

Figure 3:
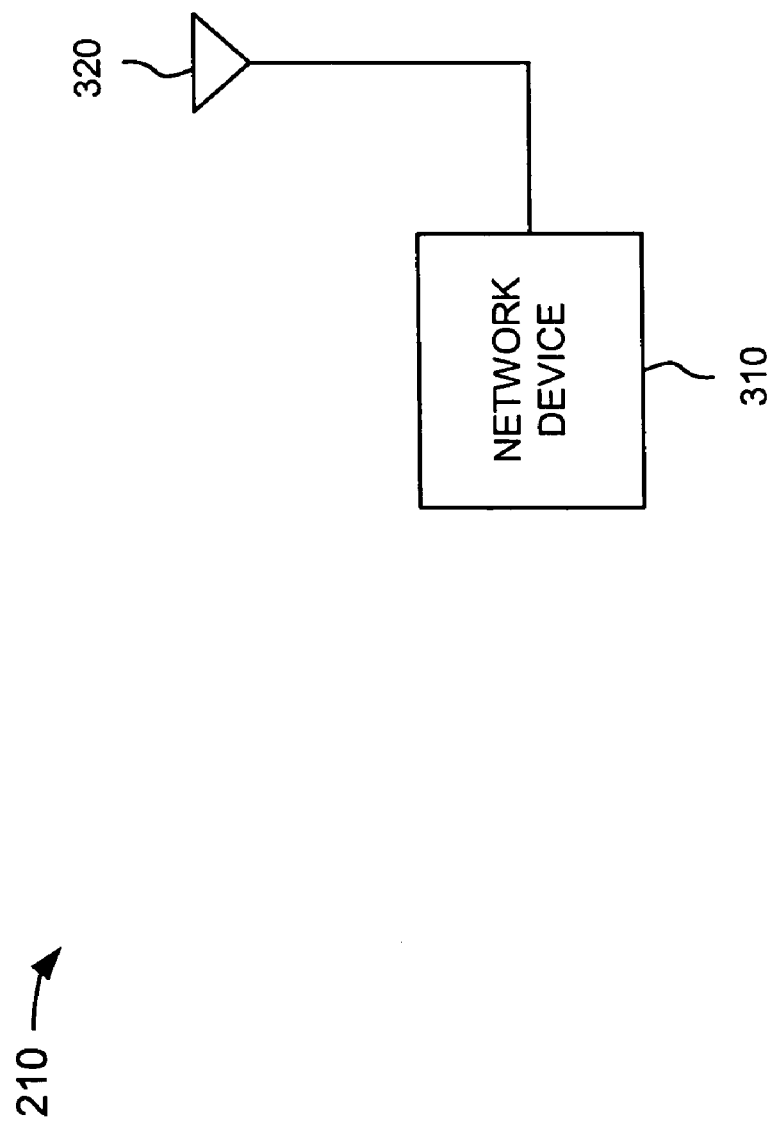
FIG. 3 is an exemplary block diagram of a node in the network of FIG. 2 according to an implementation consistent with the principles of the invention.

FIG. 3 is an exemplary diagram of a node 210 according to an implementation consistent with the principles of the invention. Node 210 may include a network device 310 and an antenna 320. Network device 310 may include a device that is capable of moving, communicating, and/or performing some function or carrying out some objective, either alone or in combination with other nodes 210. Network device 310 may communicate with other nodes 210 using antenna 320. Antenna 320 may include a directional and/or an omni-directional antenna that aids in the reception and transmission of data.

Figure 4:
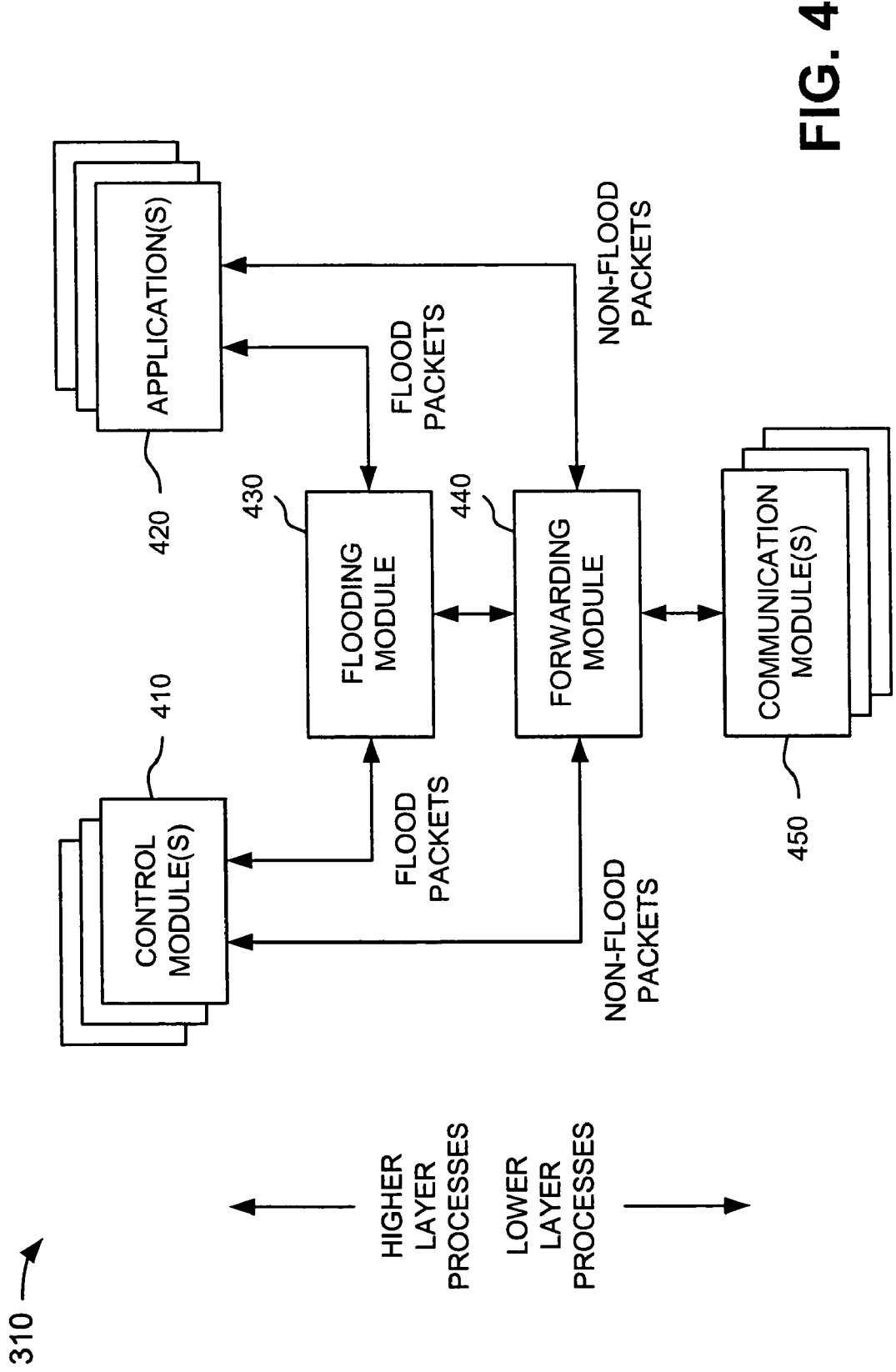
FIG. 4 is an exemplary functional block diagram of the network device of FIG. 3 according to an implementation consistent with the principles of the invention.

FIG. 4 is an exemplary functional block diagram of a portion of network device 310 according to an implementation consistent with the principles of the invention. According to one aspect consistent with the principles of the invention, these functions are implemented as instructions stored in a memory and executed by a processor within network device 310. According to another aspect, these functions are implemented as hardware, firmware, or a combination of hardware, firmware, and/or software within network device 310.

As illustrated in FIG. 4, network device 310 may include one or more control modules 410, one or more applications 420, a flooding module 430, a forwarding module 440, and one or more communication modules 450. These blocks may be viewed as different layers of processes. For example, control module(s) 410 and application(s) 420 may include higher layer processes than flooding module 430 and forwarding module 440. Communication module(s) 450 may include lower layer processes than flooding module 430 and forwarding module 440.

Control module(s) 410 may control the operation of network device 310 and may, possibly, maintain information about the topology of network 200. During operation, control module(s) 410 may generate or receive flood packets (i.e., packets transmitted to all nodes 210 in network 200) and non-flood packets (i.e., packets transmitted to one or more nodes 210 in network 200). Application(s) 420 may control network device 310 to perform one or more functions. During operation, application(s) 420 may also generate or receive flood packets and non-flood packets.

Flooding module 430 may control the flooding of flood packets according to implementations consistent with the principles of the invention. As will be described in more detail below, flooding module 430 may select and maintain information on one or more relay nodes 210 ("relays") within network 200 to retransmit flood packets. Flooding module 430 may select the relay(s) in a manner to optimize distribution of the flood packets and account for the variable power required to reach different nodes 210. Flooding module 430 may also determine other information regarding flood packets. For example, flooding module 430 may determine the amount of transmission power to be used to transmit a flood packet based, at least in part, on the location of the relay.

Forwarding module 440 may control the transmission of flood and non-flood packets. For example, forwarding module 440 may determine the manner in which a packet is to be transmitted by network device 310 (e.g., the location to send the packet, the transmission power to use for the transmission, and other factors that aid in the transmission of the packet). In the case of flood packets, forwarding module 440 may determine how to transmit the packets based at least in part on information from flooding module 430.

Communication module(s) 450 may prepare packets for transmission via antenna 330. For example, communication module(s) 450 may attach appropriate headers or modify the packets to facilitate transmission of the packets. Communication module(s) 450 may also conform the packets based on the particular communication protocol used in network 200.

Exemplary Processing

Figure 5:
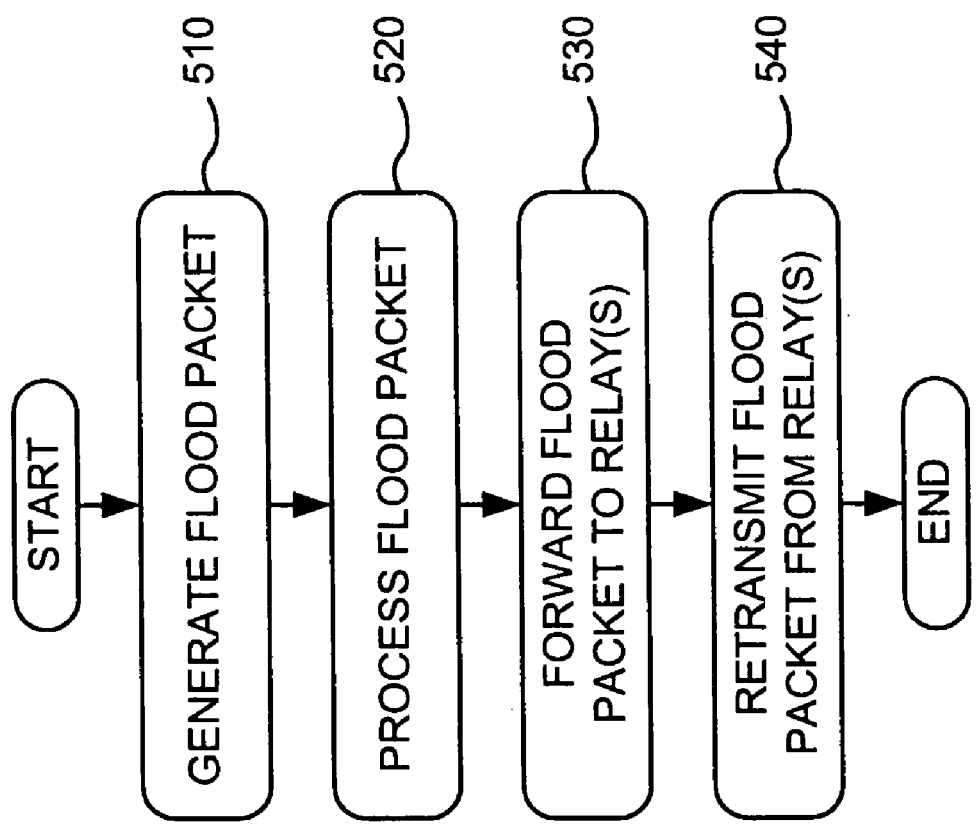
FIG. 5 is a flowchart of exemplary processing for transmitting a flood packet according to an implementation consistent with the principles of the invention.

FIG. 5 is a flowchart of exemplary processing for transmitting a flood packet according to an implementation consistent with the principles of the invention. Processing may begin with the generation of a flood packet by a source node 210 (FIG. 2) within network 200 (act 510). The flood packet may be generated by a control module 410 (FIG. 4) or an application 420 of a network device 310 (FIG. 3) of this or another node 210 within network 200 (act 510).

The flood packet may then be processed (act 520). The processing of the flood packet may differ based on whether the flood packet is to be transmitted using unicast-mode flooding or broadcast-mode flooding. The differences between the unicast-mode flooding and the broadcast-mode flooding will be explained below.

Figure 6A:
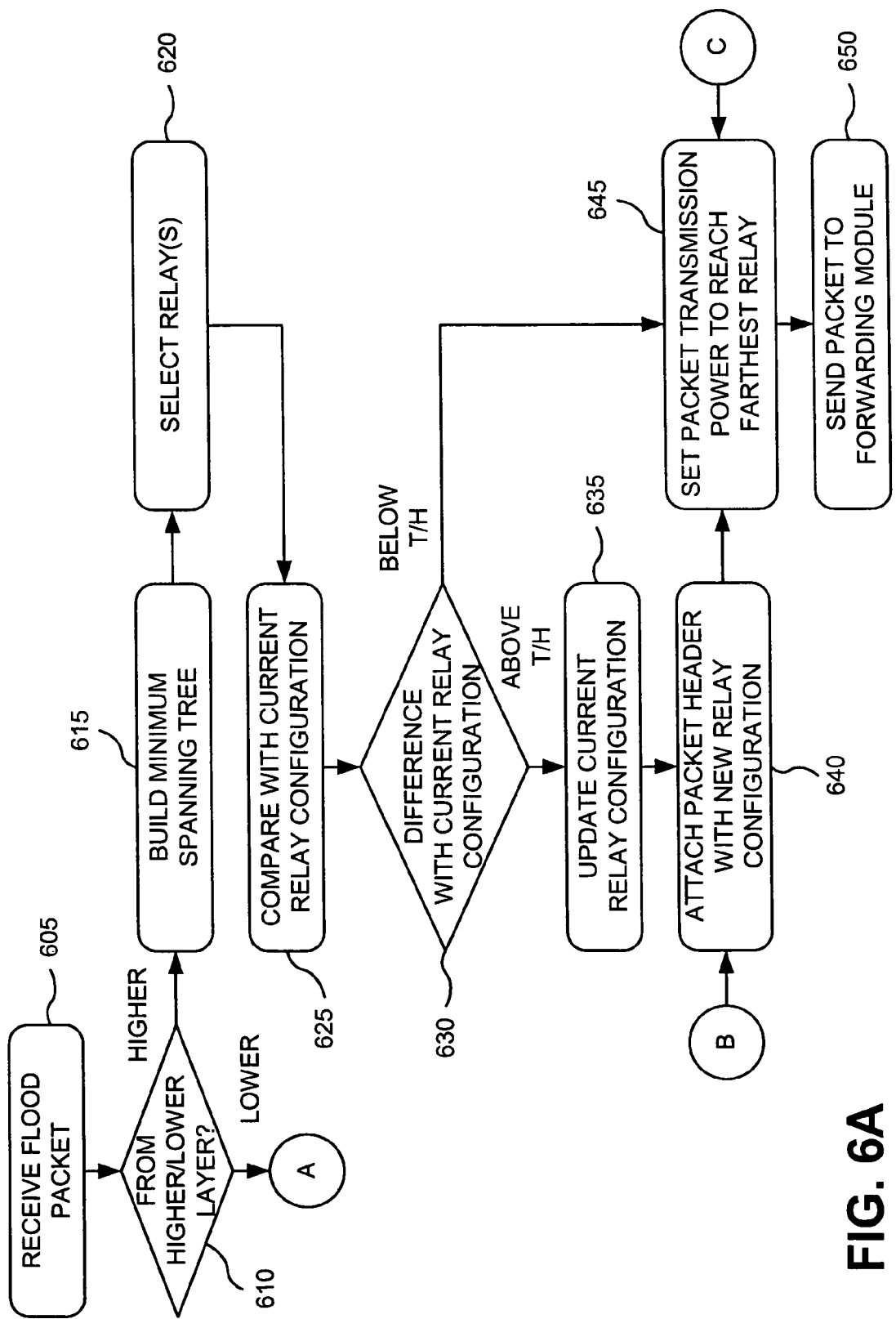
FIGS. 6A and 6B are flowcharts of exemplary processing for a flood packet according to an implementation consistent with the principles of the invention.
Figure 6B:
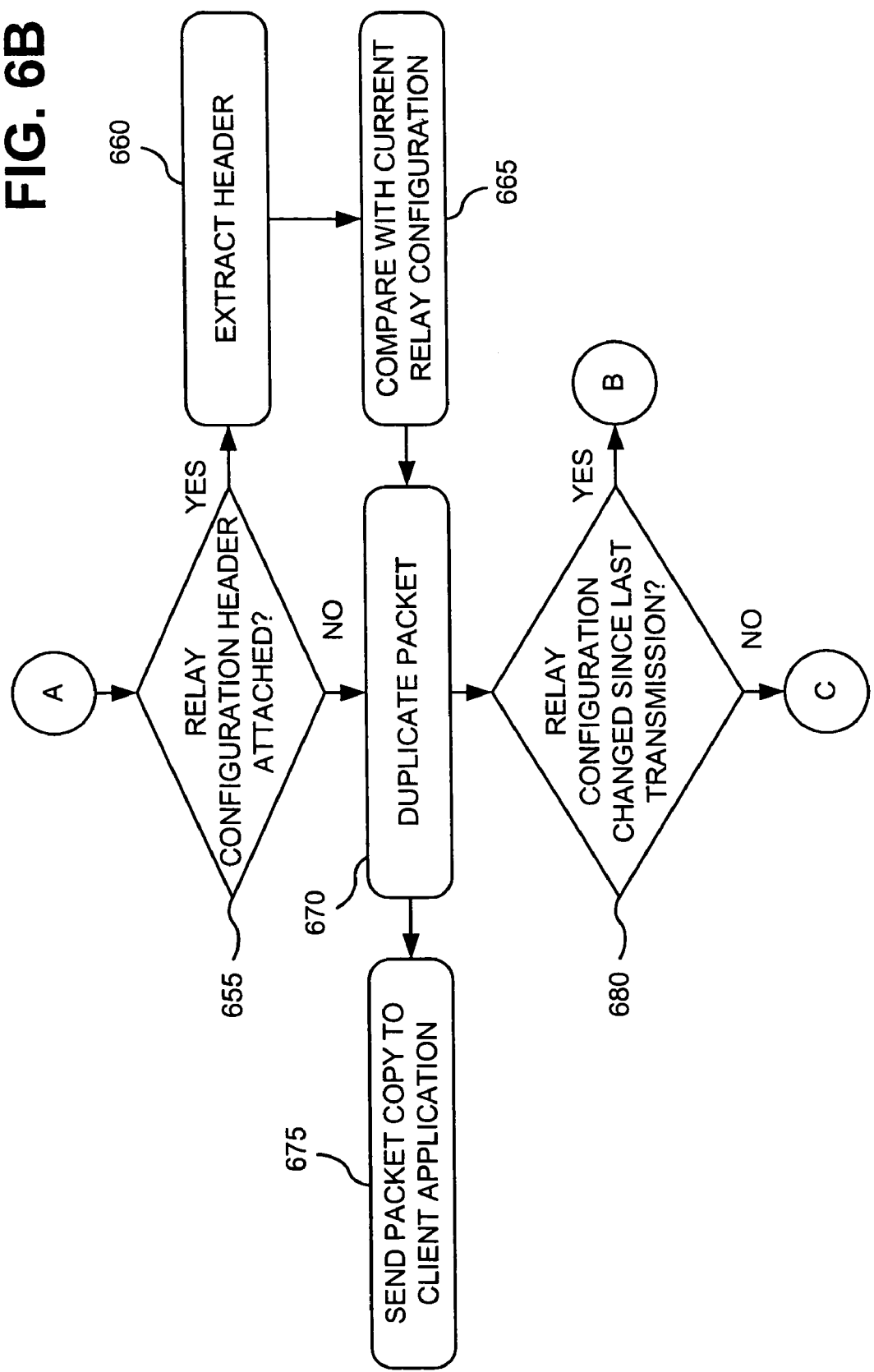

FIGS. 6A and 6B are flowcharts of exemplary processing for a flood packet, as may be performed in act 520, according to an implementation consistent with the principles of the invention. In this exemplary implementation, the processing may be performed by flooding module 430 (FIG. 4). In another implementation, at least some of the processing may be performed by one or more other portions of network device 310.

Processing may begin with flooding module 430 receiving a flood packet (act 605). Flooding module 430 may determine whether the flood packet came from a higher or lower layer process (act 610). For example, flooding module 430 may determine whether the flood packet came from a control module 410 or an application 420 (higher layer process) or from forwarding module 440 (lower layer process).

If the received flood packet came from a higher layer process, forwarding module 430 may build a minimum spanning tree of the flood source's n-hop (e.g., 2-hop) neighborhood (act 615). The cost of the tree may be minimized using link transmission power as a cost metric. In unicast-mode flooding, this minimization is straightforward. For example, flooding module 430 may construct the minimum spanning tree using a Least Unicast Cost algorithm that superimposes the minimum-cost paths from the flood source to each n-hop neighbor.

In broadcast-mode flooding, minimization of the cost of the tree becomes an NP-complete problem and heuristics methods may be employed. For example, flooding module 430 may construct the minimum spanning tree using a Broadcast Incremental Power (BIP) algorithm. BIP builds the minimum spanning tree iteratively based on a greedy heuristic. At each step, BIP may determine the set of minimum spanning tree candidates reachable by members of the current tree and add the candidate that requires the least increase of transmission power to be reached.

Once the minimum spanning tree has been built, flooding module 430 may select the 1-hop neighbors of the tree root as relays if they lead to any of the 2-hop neighbors (act 620). Flooding module 430 may compare this new relay configuration to the current relay configuration (i.e., previously-selected relays) (act 625). This comparison may be made against a predetermined (possibly user-configurable) threshold (T/H). If the difference between these configurations is above the threshold, then flooding module 430 may update the current relay configuration with the new relay configuration (acts 630 and 635).

Flooding module 430 may then attach to the flood packet a short additional header ("relay configuration header") with the new relay configuration (act 640). This header may inform the relays to which 2-hop neighbors they must retransmit the current and subsequent flood packets received from this source. In one implementation, flooding module 430 may attach the relay configuration header only in situations where the minimum spanning tree has changed (e.g., when the difference between the new and current relay configurations is below the threshold).

Flooding module 430 may set the packet transmission power for the flood packet (act 645). Flooding module 430 may determine the packet transmission power based, at least in part, on a result of the comparison of the new relay configuration and the current relay configuration. If the difference between these configurations is above the threshold, then flooding module 430 may determine the packet transmission power based on the new relay configuration. If the difference is below the threshold, then flooding module 430 may determine the packet transmission power based on the current relay configuration. Flooding module 430 may set the packet transmission power for the flood packet so as to reach the farthest relay in the relay configuration. Flooding module 430 may then send the flood packet to forwarding module 440 for eventual transmission to the relays (act 650).

If the flood packet received by flooding module 430 came from a lower layer process, flooding module 430 may determine whether the flood packet includes an attached relay configuration header (act 655) (FIG. 6B). If the flood packet includes the relay configuration header, flooding module 430 may extract the header and compare it with the current relay configuration (acts 660 and 665).

Flooding module 430 may duplicate the flood packet and send a copy to a client application (e.g., a control module 410 and/or an application 420) (acts 670 and 675). Flooding module 430 may also determine whether the relay configuration has changed since the last transmission (act 680). A change in the relay configuration may be identified by an attached relay configuration header that contains a new relay configuration.

If the relay configuration has changed, flooding module may attach a relay configuration header, which reflects the new relay configuration, to the flood packet (act 640) (FIG. 6A). Flooding module 430 may set the packet transmission power for the flood packet (act 645). If the relay configuration has changed, then flooding module 430 may determine the packet transmission power based on the new relay configuration. If the relay configuration has not changed, however, then flooding module 430 may determine the packet transmission power based on the current relay configuration. Flooding module 430 may set the packet transmission power for the flood packet so as to reach the farthest relay in the relay configuration. Flooding module 430 may then send the flood packet to forwarding module 440 for eventual transmission to the relays (act 650).

Returning to FIG. 5, node 210 may transmit the flood packet to the relay(s) in the relay configuration (act 530). Upon receiving a flood packet, a relay may retransmit the flood packet to one or more other relays or other nodes (act 540). In one implementation, the relay may use techniques similar to those described above to identify additional relays to which to send the flood packet. This processing may continue until all of nodes 210 in network 200 receive a single copy of the flood packet.

EXAMPLE

Figure 7A:
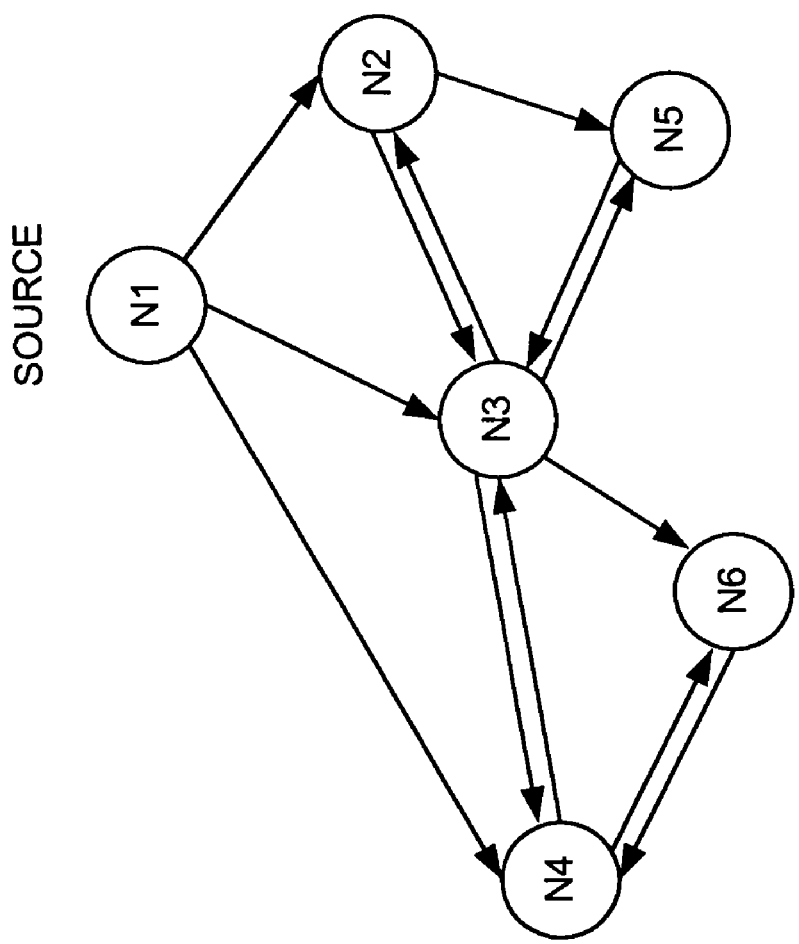
FIGS. 7A-7D illustrate exemplary operation of unicast and broadcast mode flooding, consistent with the principles of the invention, as compared to conventional flooding and MPR flooding.
Figure 7B:
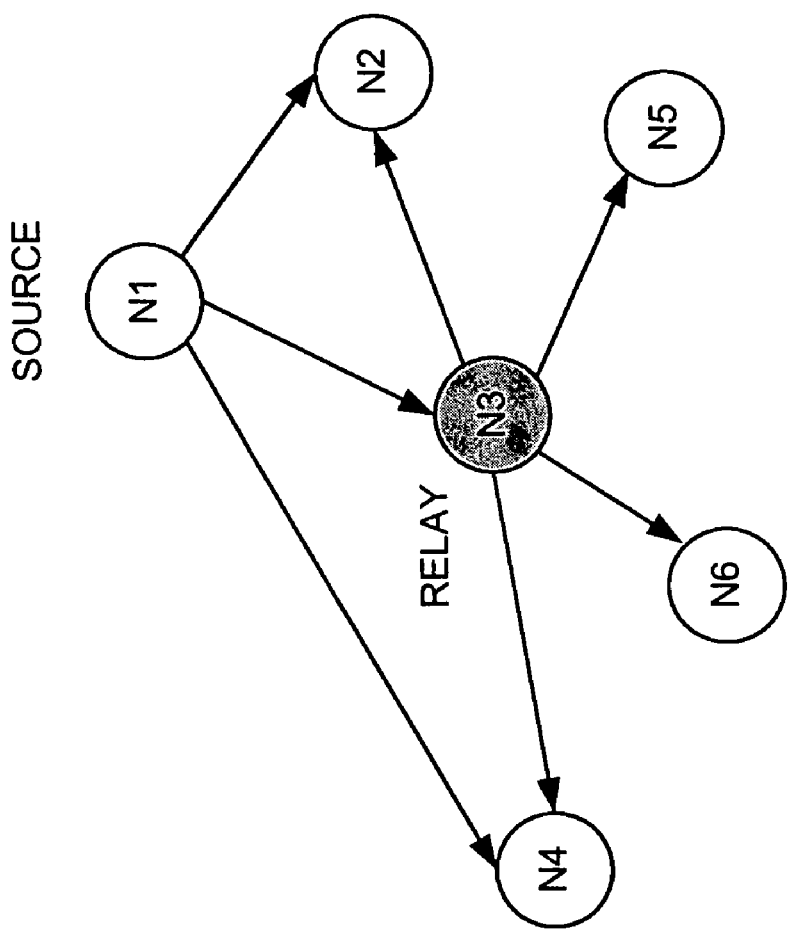
Figure 7C:
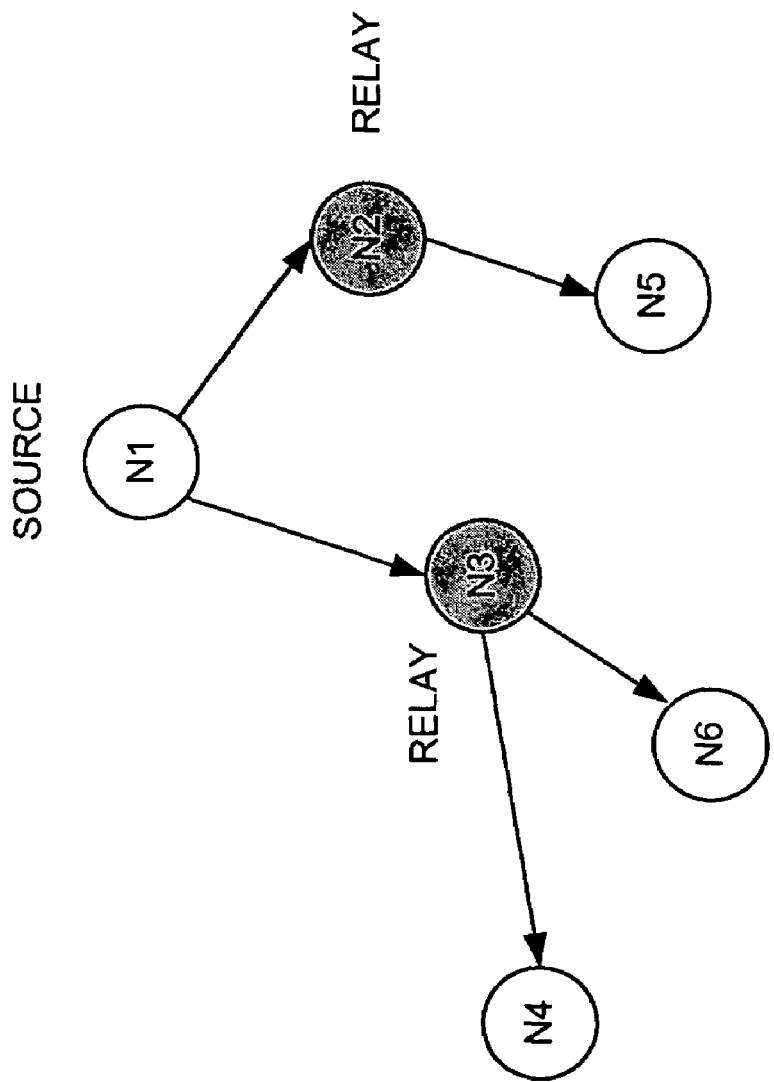
Figure 7D:
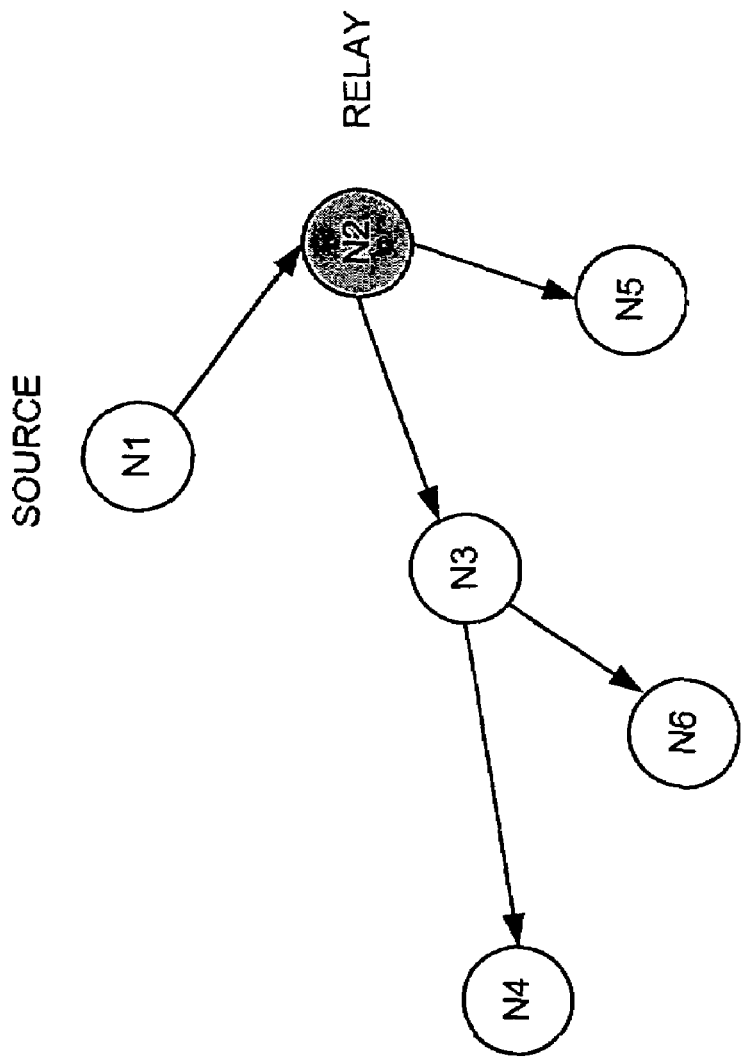

FIGS. 7A-7D illustrate exemplary operation of unicast and broadcast mode flooding, consistent with the principles of the invention, as compared to conventional flooding and MPR flooding. FIG. 7A illustrates the conventional flooding; FIG. 7B illustrates conventional MPR flooding; FIG. 7C illustrates unicast-mode flooding; and FIG. 7D illustrates broadcast-mode flooding. In these figures, an arrow represents a packet transmission and a gray node represents a relay node. As illustrated in these figures, systems and methods consistent with the principles of the invention may significantly reduce the transmissions necessary to disseminate a packet in a n-hop neighborhood and, consequently, network-wide.

In the flood case illustrated in FIG. 7A, nodes receive multiple copies of the flood packet, thereby consuming energy. For example, node N3 sends copies of the flood packet to nodes N2, N4, N5, and N6 and receives copies of the flood packet from nodes N1, N2, N4, and N5. In the MPR case illustrated in FIG. 7B, node N3 is selected as a relay (and shown as shaded). Node N3 sends copies of the flood packet to nodes N2 and N4-N6. In this case, however, nodes N2 and N4 receive multiple copies of the packet: one from node N1 and another from node N3.

In the unicast-mode flooding illustrated in FIG. 7C, nodes N2 and N3 are selected as relays (and shown as shaded). Source node N1 instructs relays N2 and N3 to which 2-hop nodes to send the flood packet. In other words, node N2 is instructed to send the flood packet to node N5 and node N3 is instructed to send the flood packet to nodes N4 and N6. As shown, no node receives multiple copies of the flood packet.

In the broadcast-mode flooding illustrated in FIG. 7D, node N2 is selected as a relay (and shown as shaded). Source node N1 instructs relay N2 to which n-hop nodes to send the flood packet. In other words, node N2 is instructed to send the flood packet to nodes N3 and N5. For nodes outside the n-hop neighborhood (e.g., 2-hop neighborhood), source node N1 takes no responsibility in assuring that these nodes receive a copy of the flood packet. Instead, other nodes take this responsibility. For example, node N2 in FIG. 7D is responsible for configuring the relay paths to nodes in its n-hop neighborhood, and so on. As shown, no node receives multiple copies of the flood packet.

Figure 8:
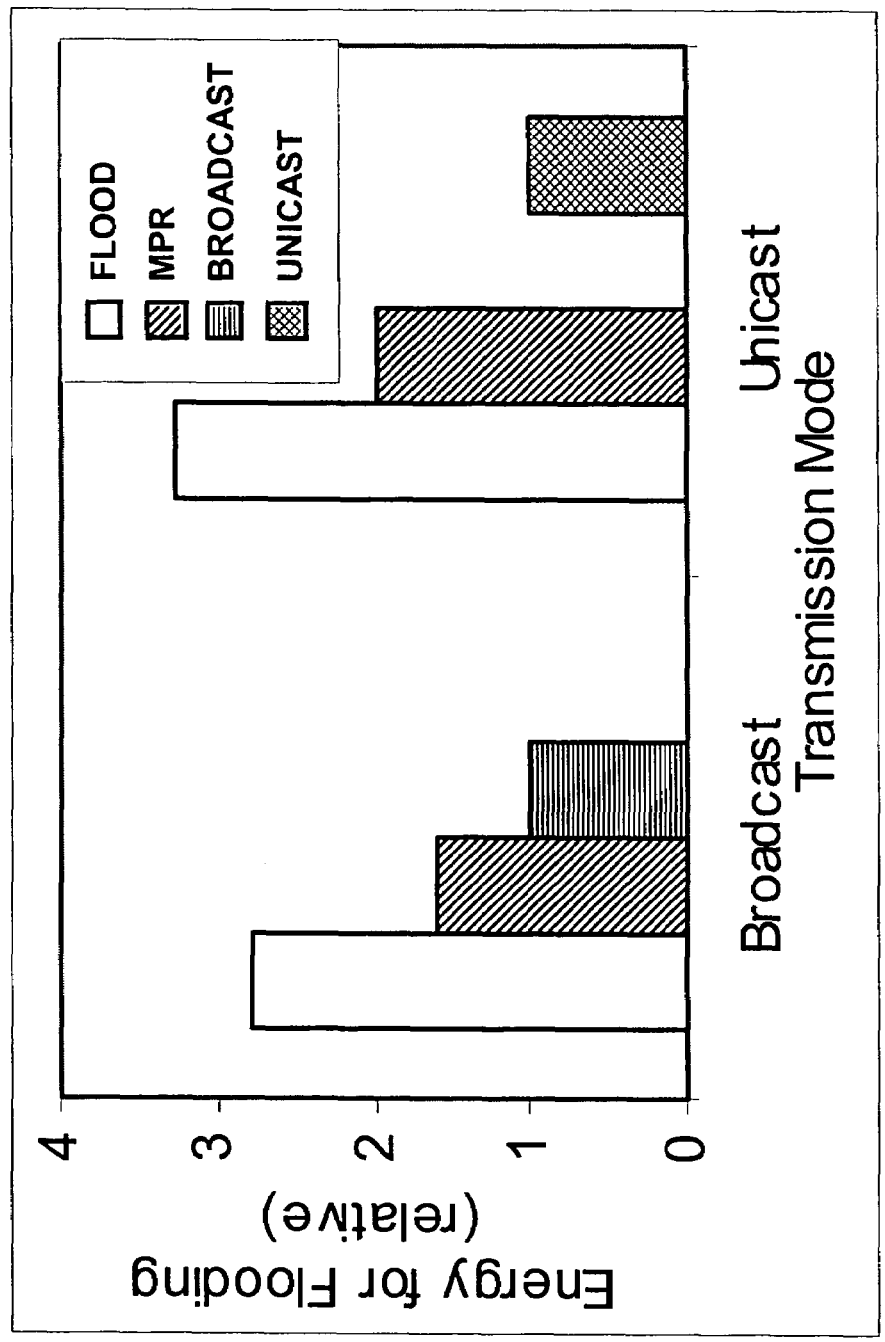
FIG. 8 is an exemplary graph that compares an estimated energy for disseminating a packet according to the cases shown in FIGS. 7A-7D.

FIG. 8 is an exemplary graph that compares an estimated energy for disseminating a packet according to the cases shown in FIGS. 7A-7D. The exemplary values provided in FIG. 8 are normalized with the lowest value taken as unity. To facilitate the comparison, it may be assumed that transmissions in the flood and MPR cases, which always occur at maximum power, include the ability to reduce transmission power to the level necessary to reach the farthest 1-hop neighbor. It should be noted, however, that this capability is not known to exist in current flood and MPR techniques.

Performance Evaluation

Figure 9:
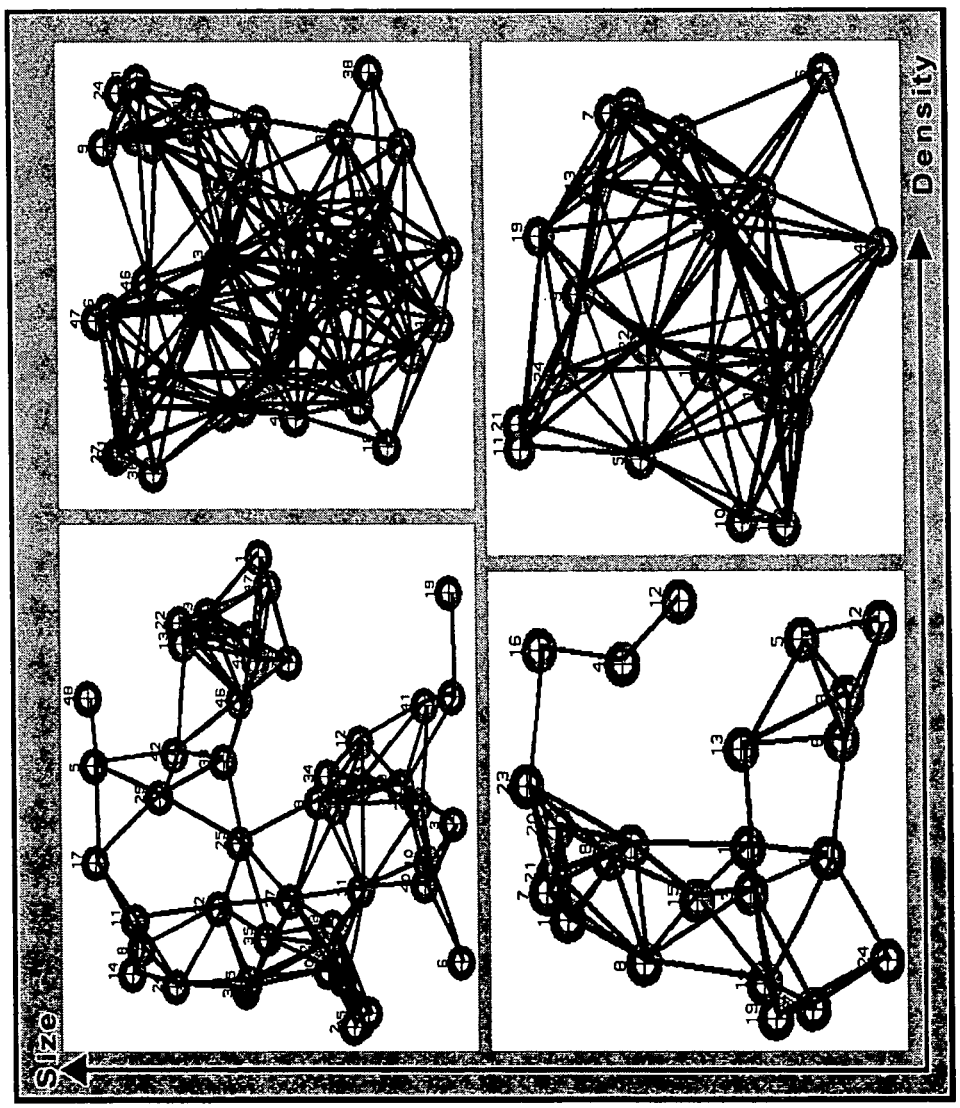
FIG. 9 is an exemplary graph that provides a few samples of test scenarios used to illustrate systems and methods consistent with the principles of the invention.

A simulation of unicast and broadcast mode flooding was conducted over a wide range of test scenarios, varying the network size, density (and hence connectivity), and mobility. Mobility was varied by controlling the number of moving network members. FIG. 9 is an exemplary graph that provides a few samples of test scenarios used to illustrate systems and methods consistent with the principles of the invention.

For this simulation, the following radio model parameters were used:

| PARAMETER | VALUE |
|---|---|
| Transmission Rate | 2 Mb/s |
| FEC Rate | 0.5 |
| Effective Data Rate | 1 Mb/s |
| Frequency | 400 MHz |
| Transmit Output Power | 200 mW |
| Transmit Power Consumption | 2.8 W |
| Antenna Gain | 6 dB |

The flood traffic used for these test scenarios was generated by the nodes' routing modules. The routing module receives updates on the status of the links to the node's immediate neighbors from the link metric calculator. These updates are periodically compiled into LSU packets, which are flooded throughout the network. The simulation aggregates the energy used to disseminate these packets. Basing this simulation on the flood traffic generated by a realistic network application, rather than artificial flooding, provides additional confidence in the realism of the obtained results.

Figure 10:
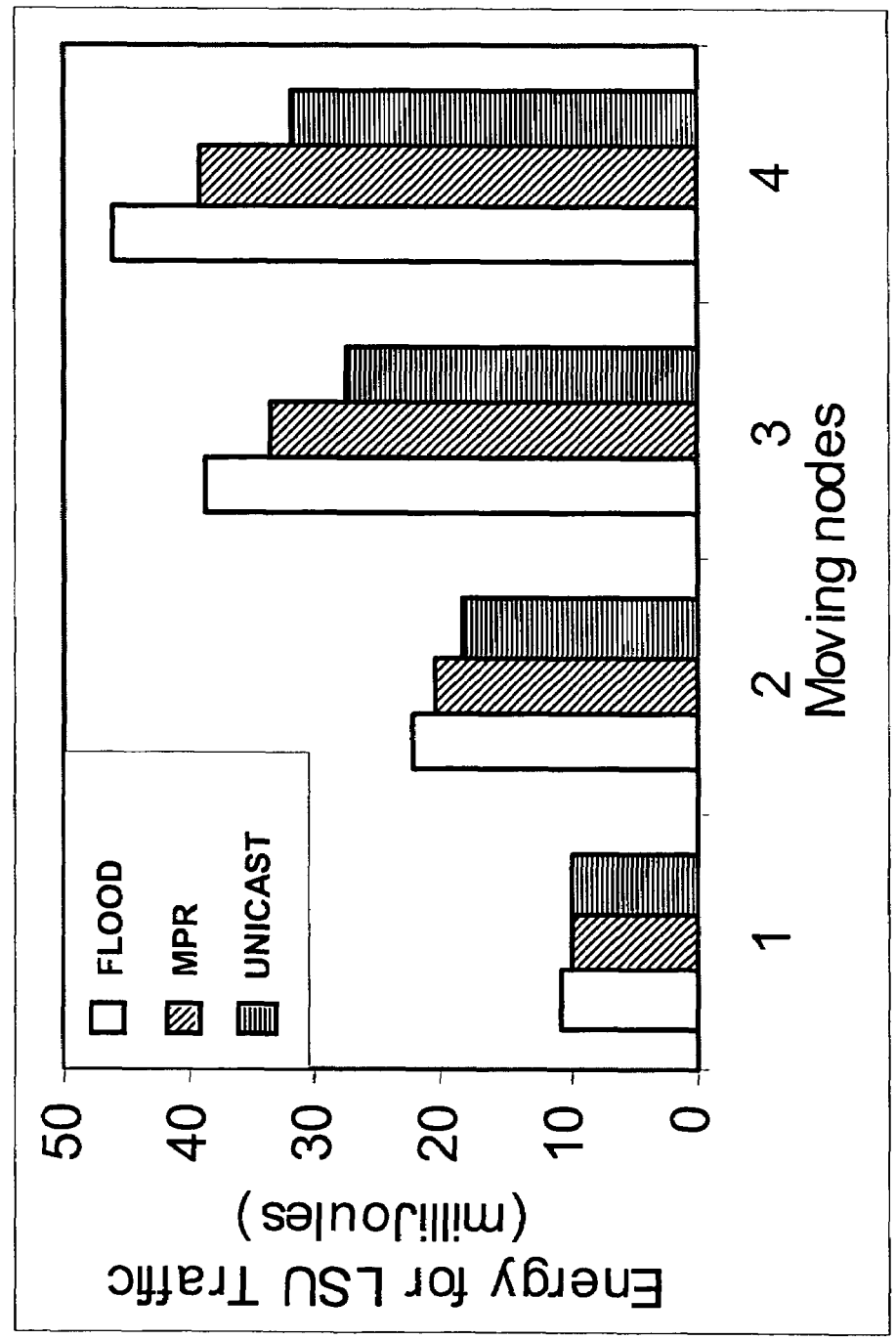
FIG. 10 is a graph that illustrates exemplary energy-related results for unicast-mode flooding.

FIG. 10 is a graph for unicast-mode flooding that provides exemplary results for a 24-node scenario with nodes randomly spread in a 20 km$^2$ area and moving at a speed of 2 m/s. Note that in unicast-mode flooding, the routing module may employ LSU batching to reduce the redundancy of generated flood packets. Even when operating under such constrained flood generation, unicast-mode flooding reduces energy consumption by approximately 32%, whereas the MPR case saves only around 15%. Moreover, the trend of energy reduction increases as mobility (hence flood traffic) grows.

Figure 11:
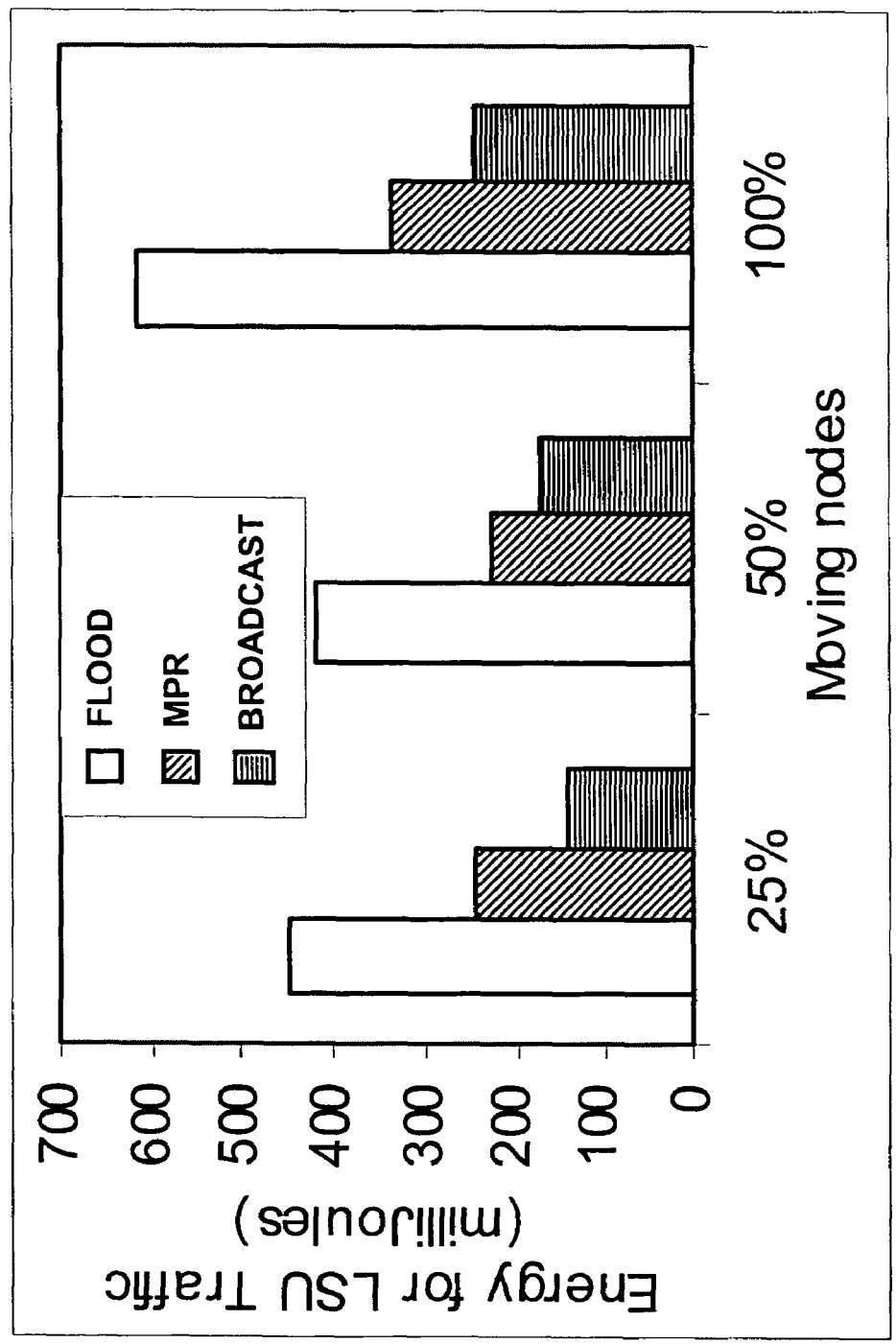
FIG. 11 is a graph that illustrates exemplary energy-related results for broadcast-mode flooding.

FIG. 11 is a graph for broadcast-mode flooding that provides exemplary results for a 48-node scenario. Here, broadcast-mode flooding achieves a significantly greater reduction in energy consumption of approximately 70%, clearly outperforming the MPR case's 50% reduction. The network in which the broadcast-mode flooding was tested uses Hazy-Sighted Link State to restrict the propagation of LSU flood traffic.

Figure 12:
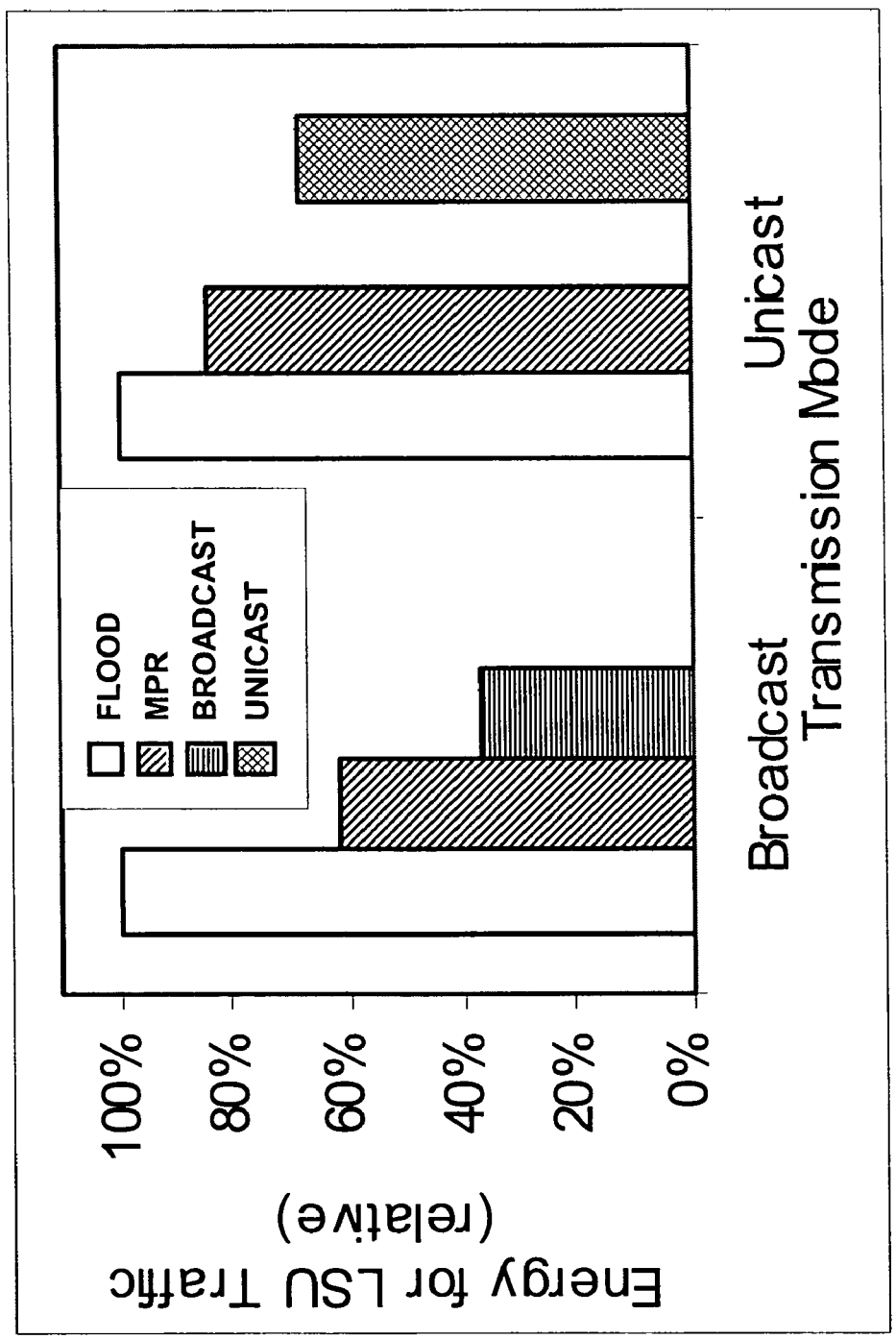
FIG. 12 is a graph that illustrates exemplary results over an entire test space.

FIG. 12 is a graph that illustrates exemplary results over the entire test space. The graph shows an average energy reduction for the broadcast-mode flooding of approximately 65%. Thus, it can be expected that, on average, a network using the broadcast-mode flooding to last three times longer than one using unconstrained flooding and two times longer than one using MPR (which, as described above, was simplistically enhanced with variable-power transmission capabilities). The unicast-mode flooding provides an average energy reduction of approximately 30%.

CONCLUSION

Systems and methods consistent with the principles of the invention provide energy-efficient flooding techniques. One of these techniques involved unicast transmissions and another technique involved broadcast transmissions. These flooding techniques are capable of supporting both reactive and proactive routing approaches and are compatible with methods for constraining flood traffic, such as hierarchical network organization, flood-packet batching, etc. Based on realistic simulation models, these techniques show significant energy-savings of up to 70%, and hence the potential for a three-fold extension in the longevity of battery-operated mobile nodes in dynamic settings.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, the graphs illustrated in FIGS. 8 and 10-12 are purely exemplary. Different results may be obtained by changing the parameters.

While series of acts have been described with regard to FIGS. 5, 6A, and 6B, the order of the acts may differ in other implementations consistent with the principles of the invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for packet flooding in a network including a plurality of nodes, comprising:
   generating a flood packet;
   selecting one or more of the nodes as a like number of one or more relays to form a first relay configuration;
   identifying a difference between the first relay configuration and a second relay configuration;
   comparing the difference between the first relay configuration and the second relay configuration to a threshold;
   updating the second relay configuration with the first relay configuration when the difference is above the threshold;
   attaching a header to the flood packet, the header instructing the one or more relays to which of the nodes to send the flood packet; and
   sending the flood packet with the attached header to the one or more relays.

2. The method of claim 1, wherein the selecting one or more of the nodes as a like number of one or more relays includes:
   building a minimum spanning tree that covers an n-hop neighborhood of one of the nodes that generated the flood packet, and
   using the minimum spanning tree to identify the one or more relays.

3. The method of claim 1, wherein the attaching a header to the flood packet includes forming the header based at least in part on the first relay configuration.

4. The method of claim 1, further comprising: setting a transmission power for the flood packet with the attached header based on a location of the one or more relays.

5. The method of claim 4, wherein the setting a transmission power includes determining the transmission power based at least in part on a distance to a farthest one of the one or more relays.

6. The method of claim 1, further comprising:
   receiving the flood packet with the attached header at one of the one or more relays as a receiving relay;
   extracting the attached header; and
   retransmitting the flood packet from the receiving relay to one or more other ones of the nodes.

7. The method of claim 6, wherein the retransmitting the flood packet with the attached header includes duplicating the flood packet.

8. The method of claim 6, wherein the retransmitting the flood packet with the attached header includes: identifying one or more other nodes as one or more additional relays, and sending the flood packet with the attached header to the one or more additional relays.

9. The method of claim 1, wherein the sending the flood packet with the attached header includes: transmitting the flood packet as a unicast transmission.

10. The method of claim 1, wherein the sending the flood packet with the attached header includes: transmitting the flood packet as a broadcast transmission.

11. A system for flooding packets in a network that includes a plurality of nodes, comprising:
    means for receiving a flood packet;
    means for identifying one or more of the nodes as a like number of one or more relays to form a first relay configuration;
    means for identifying a difference between the first relay configuration and a second relay configuration;
    means for comparing the difference between the first relay configuration and the second relay configuration to a threshold;
    means for updating the second relay configuration with the first relay configuration when the difference is above the threshold;
    means for sending the flood packet to the one or more relays; and
    means for retransmitting the flood packets from the one or more relays such that each of the nodes in the network receives one copy of the flood packet.

12. A system for flooding packets in a network that includes a plurality of nodes, comprising:
    a flooding module configured to:
       receive a flood packet,
       select one or more of the nodes as a like number of one or more relays to form a first relay configuration,
       identify a difference between the first relay configuration and a second relay configuration, compare the difference between the first relay configuration and the second relay configuration to a threshold, update the second relay configuration with the first relay configuration when the difference is above the threshold, attach a header to the flood packet, the header instructing the one or more relays to which of the nodes to send the flood packet; and a forwarding module configured to:

send the flood packet with the attached header to the one or more relays.

13. The system of claim 12, further comprising at least one of a directional antenna and an omni-directional antenna.

14. The system of claim 12, wherein the flooding module is configured to:

build a minimum spanning tree that covers an n-hop neighborhood of one of the nodes that generated the flood packet, and identify the one or more relays based at least in part on the minimum spanning tree.

15. The system of claim 12, wherein the header is formed based at least in part on the first relay configuration.

16. The system of claim 12, wherein the flooding module is further configured to set a transmission power for the flood packet with the attached header based on a location of the one or more relays.

17. The system of claim 16, wherein when setting a transmission power, the flooding module is configured to determine the transmission power based at least in part on a distance to a farthest one of the one or more relays.

18. The system of claim 12, wherein the forwarding module is configured to transmit the flood packet with the attached header as a unicast transmission.

19. The system of claim 12, wherein the forwarding module is configured to transmit the flood packet with the attached header as a broadcast transmission.

* * * * *